United States Patent [19]

Heshmat

[11] Patent Number: 5,085,185
[45] Date of Patent: Feb. 4, 1992

[54] POWDER-LUBRICANT PISTON RING FOR DIESEL ENGINES

[75] Inventor: Hooshang Heshmat, Niskayuna, N.Y.

[73] Assignee: Mechanical Technology, Incorporated, Latham, NY

[21] Appl. No.: 582,473

[22] Filed: Sep. 14, 1990

[51] Int. Cl.⁵ .................................. F02F 3/00
[52] U.S. Cl. ............................ 123/193 P; 92/153; 92/176; 277/216; 277/194
[58] Field of Search .................... 92/153, 155, 176; 184/18, 98, 99; 277/194, 216, 3, 27; 123/193 P

[56] References Cited

U.S. PATENT DOCUMENTS

| | | | |
|---|---|---|---|
| 2,419,192 | 4/1947 | Anderson | 92/153 |
| 3,960,132 | 6/1976 | Goserud | 123/41.86 |
| 4,346,685 | 8/1982 | Fujikawa | 123/193 P |
| 4,470,388 | 9/1984 | Showalter | 277/216 |
| 4,615,261 | 10/1986 | Meijer | 277/194 |
| 4,651,629 | 3/1987 | Castarede | 92/176 |

FOREIGN PATENT DOCUMENTS 0696845  8/1940  Fed. Rep. of Germany ........ 92/155

Primary Examiner—E. Rollins Cross
Assistant Examiner—M. Macy
Attorney, Agent, or Firm—Joseph C. Sullivan; Joseph V. Claeys

[57] ABSTRACT

A powder-lubricated piston is disclosed for diesel engines, particularly adiabatic diesel engines and coal-water slurry fueled diesel engines. Rings are provided for the piston which flex in response to combustion within the combustion chamber.

18 Claims, 5 Drawing Sheets

Lubricant Powders

| Sulfides | Selenides | Telurides | Metal Oxides | Other Solids |
|---|---|---|---|---|
| $Ag_2S$ | — | $AgTe$ | $TiO_2$ | — |
| $Bi_2S_3$ | $Bi_2Se_3$ | $Bi_2Te_3$ | — | $BiOCd$ |
| $CdS$ | $CdSe$ | $CdTe$ | $CdO$ | — |
| $Ce_2S_3$ | — | — | — | $CuCl_2$ |
| $HgS$ | — | — | $NiO_2$ | $BN$ |
| $MoS_2$ | — | — | — | Graphite |
| $PbS$ | — | — | $PbO$ | $PCH_2$ |
| $ZnS$ | $ZnSe$ | $ZnTe$ | $ZnO$ | — |

POWDER-LUBRICANT PISTON RING FOR DIESEL ENGINES

BACKGROUND OF THE INVENTION

1. Field of the Invention

The current invention relates to a lubrication system including powder-lubricated piston rings for diesel engines, particularly adiabatic diesel engines and coal-water slurry fueled diesel engines.

2. Description of the Prior Art

In order to achieve an adiabatic diesel cycle in an internal combustion engine, heat transfer from the cylinder walls to the cooling system and radiator must be blocked. As such heat transfer normally accounts for 30-35% of the total fuel energy of a diesel cycle, such a configuration results in increased surface temperatures at the cylinder and rings, particularly at the top of the stroke of the piston. As these increased surface temperatures exceed the current limit of 500°-600° F. for the best available synthetic hydrocarbon lubricants, current adiabatic diesel cycles are derated to maintain the temperature levels acceptable for hydrocarbon lubrication. This, of course, results in lower fuel efficiency and lower power per unit weight.

Even in such a derated system, much of the additional energy in the combustion gases resulting from the insulation of the cylinders and resultant low heat rejection in an adiabatic diesel cycle cannot be removed in the primary expansion process in the cylinders. A commonly suggested way of improving efficiency by capturing this additional energy is to use a turbocharger followed by a power turbine coupled to the transmission. The engine then becomes a high-temperature turbomachine similarly requiring a high-temperature lubrication system in order to achieve optimum performance.

Similarly, hydrocarbon-based lubrication systems for coal-water slurry (CWS) or coal-air fueled diesel engines are deficient. While the ability to achieve full combustion and reasonable power levels has been demonstrated for a CWS-fueled diesel cycle, the piston ring/cylinder liner wear rates reported are 20 to 150 times higher than that encountered with conventional fuels. Piston ring wear in CWS-fueled diesel engines is caused by the abrasiveness of the coal ash formed, and in some instances, by the abrasiveness of the coal-water slurry. This high abrasiveness is contributed to by the fact that the ash content of CWS fuels, even with the best existing clean coal technology, ranges from 0.5-1.0%, which is ten to twenty times the ash content in heavy, residual fuel oil. Moreover, liquid lubricants can provide very little protection against wear when the abrasive particle size is such that it is on the same order of magnitude as the oil film thickness. As liquid lubricant requires motion of the lubricated parts to generate a film, wear is particularly acute at the speed reversal points of the piston as the ring/liner contact at these points will be either unlubricated or in the boundary lubricated regime. The resulting high wear rates are a major technological barrier to the full utilization of CWS-fueled diesel technology.

Additionally, CWS-fueled diesel engines have the potential for severe lubrication system malfunctions in the event of the mixing of the water from the slurry with the engine oil with the resultant mixture emulsifying into a gel or in the event of blowby and transfer by the piston rings of the abrasive ash into the crankcase oil.

OBJECTS AND SUMMARY OF THE INVENTION

It is therefore an object of this invention to provide a lubrication system for a diesel engine which can operate at temperatures encountered in an adiabatic diesel cycle.

It is therefore a further object of this invention to provide a lubrication system for a diesel engine which can operate at temperatures exceeding 600° F. thereby allowing the diesel engine to operate with a higher fuel efficiency and a higher power output.

It is therefore a still further object of this invention to provide a lubrication system for a diesel engine which will provide adequate lubrication for use with CWS and other high ash fuels.

It is therefore a still further object of this invention to provide a lubrication system for a CWS-fueled diesel engine which will prevent the mixture of the water from the slurry and hydrocarbon lubricants from the diesel engine.

These and other objects of the invention are effectively attained by providing a powder-lubricated piston ring for a diesel engine, particularly a diesel engine which uses an adiabatic cycle or is fueled by coal-water slurry or coal-air mixture. Two embodiments are disclosed—the first includes powder-lubricated piston rings in combination with hydrodynamic compliant-mount bearings, the second includes powder-lubricated piston rings in combination with oil-lubricated hydrostatic piston rings.

The powder used as a lubricant interacts to provide surface separation and to form a quasi-hydrodynamic lubricant film between the piston and the cylinder. The motion of the particles over each other in the dry powder film is much like the motion of the molecules in a liquid permitting the fine powder or particulate material to flow and provide a lubricating load capacity and film thickness in much the same manner as a liquid. One major difference between a dry solid particulate film and a liquid, which is advantageous in a reciprocating engine which inherently includes piston speed reversal points, is that while a liquid requires motion of the lubricated surfaces to generate a film, a solid may provide a separating film even when the relative surface speed goes to zero. Moreover, as the relative speed between the piston and the cylinder increases, the quasi-hydrodynamic component of the film builds up, further increasing the surface separation and reducing both friction and wear. Therefore, when the piston is at top dead center (T.D.C.) while the speed is zero and where the wear is usually greatest due to the absence of a separating film in liquid hydrocarbon lubricated system, the ring and liner will be fully separated by the solid film. Thus, the full surface separation provided by the static particulate film will protect the surfaces from wear during the low-speed high-load portion of the stroke. As the piston speed increases, the film thickness will increase above the static film level due to quasi-hydrodynamic effects and can be expected to reach a maximum in the midstroke area just as it does with a liquid. As the piston slows in approaching the bottom dead center (B.D.C.) area, the film will decrease to the static film level, which will again provide complete surface separation, even at zero speed.

Moreover, significant reductions in friction and wear on the top ring in a CWS-fueled diesel engine may be achieved either by using the ash itself or the ash plus an externally introduced solid powder lubricant, to provide lubrication and wear reduction in the top ring/cylinder liner area.

The piston includes two sets of rings. The first set of rings are proximate to the combustion chamber (i.e., the upper rings) and are specifically designed to utilize the quasi-fluid behavior of a particulate solid lubricant to reduce friction and minimize wear in this ring area. The second set of rings (i.e., the lower rings) are outwardly adjacent from the first set of rings and typically oil-lubricated, although they may be gas-lubricated or powder-lubricated. The piston design assures that, in a CWS-fueled diesel engine, ash particles from the top cylinder area are not swept into the lower cylinder area and therefore into the crankcase.

Compliant and preformed ring configurations are employed to maintain convergent wedge action with external powder lubrication.

BRIEF DESCRIPTION OF THE DRAWINGS

Further objects and advantages of the invention will become apparent from the drawings, wherein.

DETAILED DESCRIPTION OF THE PREFERRED EMBODIMENT

Figure 1:
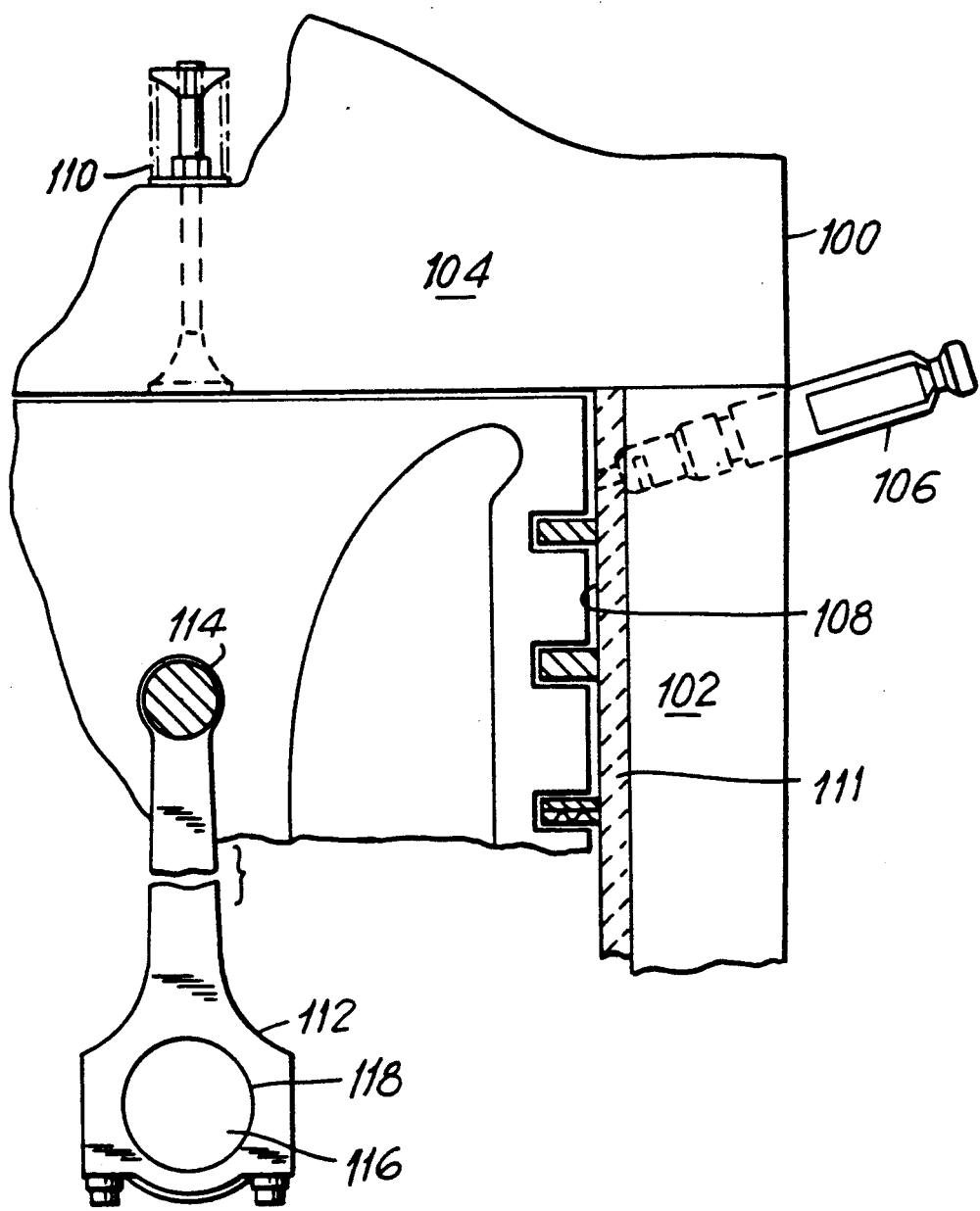
FIG. 1 discloses a schematic of the engine design of the instant invention.

Referring now to the drawings in detail wherein like numerals indicate like elements throughout the several views, FIG. 1 discloses a schematic of the design of the instant invention. Engine block 100 includes cylinder wall 102 and cylinder head 104. Powder jet 106 extends through cylinder wall 102 to inject lubricant powder (see FIG. 7 for a table of typical lubricant powders) onto cylinder liner 111. Fuel inlet valve 110 extends through cylinder head 104. Cylinder wall 102 is lined with ceramic (or other hard suitable material) liner 111. Piston 10 is shown attached to piston rod 112 via wrist pin bearings 114. Rod 112 is likewise rotatably attached to cam 116 via bearings 118. Piston 10 is shown fully inserted into cylinder 108.

Figure 2:
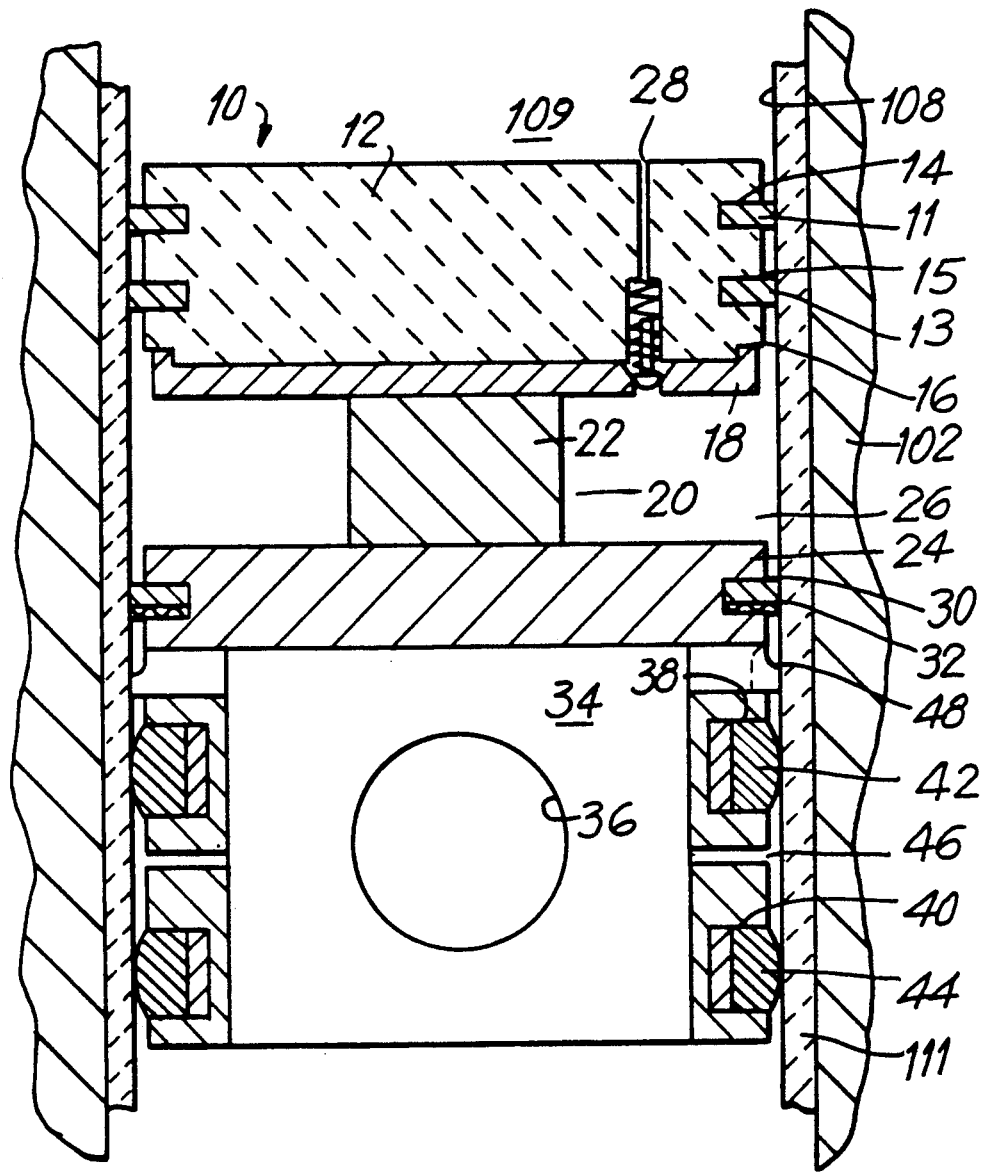
FIG. 2 discloses a hybrid powder-lubricated piston ring with a hydrodynamic compliant-mount piston ring, including a particulate return valve such as is used for CWS-fueled systems.

FIG. 2 discloses a first embodiment of the invention. Piston 10 includes a ceramic piston head 12 facing cylinder 108 thereby forming combustion chamber 109. Powder-lubricated rings 11, 13 (FIGS. 4a, 4b, 5a and 5b disclose embodiments of rings 11, 13 in greater detail) are within lateral circumferential channels 14, 15 of piston 10. Piston head 12 further includes lower circumferential chamfer 16 which engages upper heat dam plate 18 of heat dam 20. Heat dam 20 further includes heat dam support arm 22 which extends from upper heat dam plate 18 to lower heat dam plate 24. Support arm 22 has a diameter substantially less than that of piston head 12 thereby forming debris chamber 26. Particulate return valve 28 extends through piston head 12 and upper heat dam plate 18 to draw debris (coal ash, etc.) from debris chamber 26 to cylinder 108 during the scavenging cycle of the engine. This helps assure that debris or blow-by powder does not enter the crankcase of a coal-water slurry fueled diesel engine. This is of particular concern when diameter of piston head 12 is machined so as to allow coal ash to mix with the lubricant powder.

Figures 6, 7:
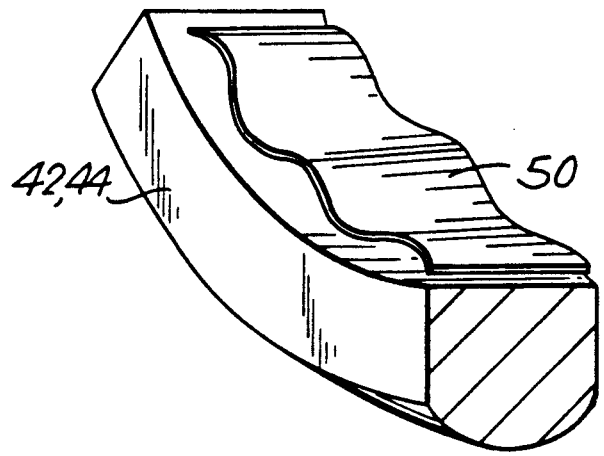
FIG. 6 discloses an inner view of the compliant mount of the multi-segmented crowned piston ring.
FIG. 7 discloses a table of typical lubricant powders.

Lower heat dam plate 24 includes circumferential channel 30 into which scraper ring 32 fits. Lower portion 34 of piston 10 engages lower heat dam plate 24. Lower portion 34 includes wrist pin bearing aperture 36 through which rod 112 is journaled via wrist pin bearings 114. Lower portion 34 further includes lateral circumferential compliant mount channels 38, 40 into which multi-segmented crowned piston rings 42, 44 are inserted thereby engaging cylinder wall 102. Piston rings 42, 44 are lubricated by standard means via oil injection ports 46. The oil from ports 46 drains through oil drain 48. FIG. 6 shows the compliant mount 50 of multi-segmented crowned piston rings 42, 44 in more detail.

Figure 3:
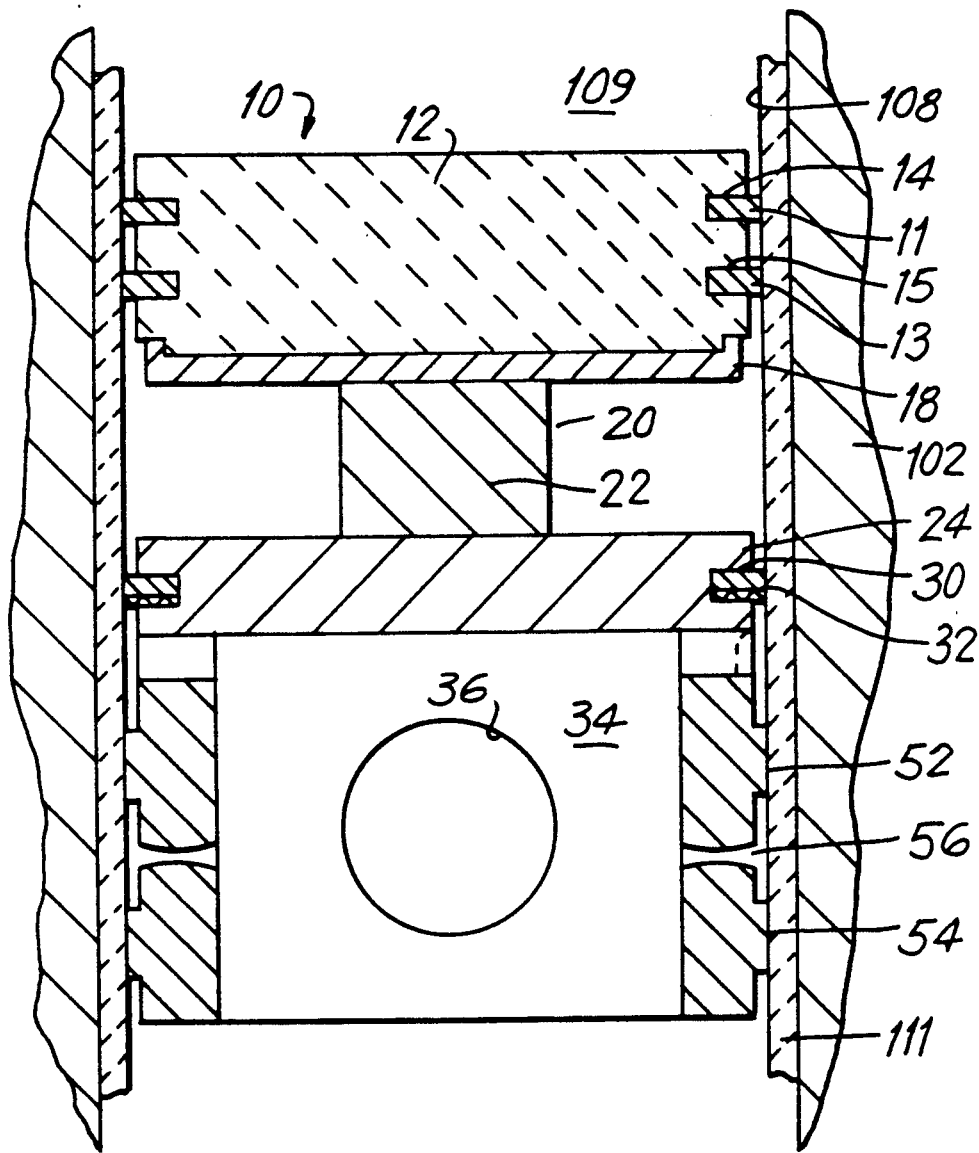
FIG. 3 discloses a hybrid powder-lubricated piston ring with an oil-lubricated hydrostatic piston ring.

FIG. 3 discloses an alternative embodiment of the invention, a hybrid powder-lubricated piston ring with an oil-lubricated hydrostatic piston ring. Multi-segmented crowned piston rings 42, 44 are replaced with hydrostatic piston rings 52, 54. The recess between hydrostatic piston rings 52, 54 includes restrictor 56. Particulate return valve 28 is not shown in this embodiment as would be appropriate for a diesel engine using a low-ash fuel. However, the inclusion of particulate return valve 28 in this embodiment would be appropriate for the use of a high-ash fuel such as coal-water slurry.

Figure 4A:
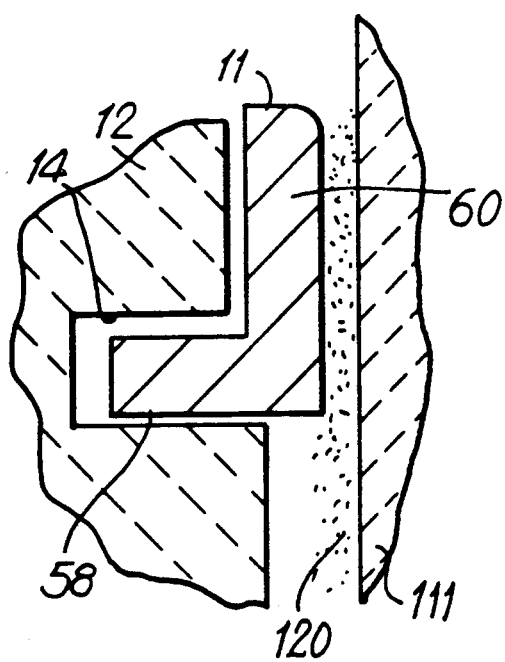
FIGS. 4a and 4b disclose a compliant piston ring for the instant invention.
Figure 4B:
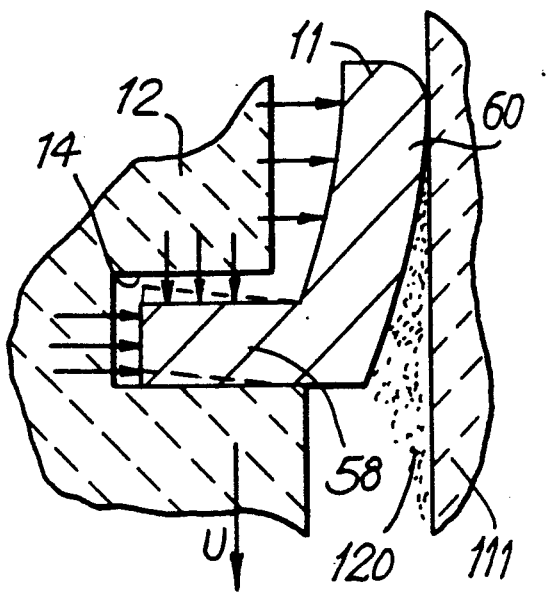

FIGS. 4a and 4b disclose a compliant piston ring design for the instant invention. As previously stated, piston head 12 includes circumferential channel 14 (or 15). Powder-lubricated ring 11 (or 13) is inserted therein so as to contact lubricant powder 120 impinging upon cylinder wall 102. See FIG. 7 for a table of typical lubricant powders. As shown in detail in FIGS. 4a and 4b, ring 11 of the compliant piston ring design has an L-shaped cross-section with a horizontal portion 58 extending into channel 14 and an upwardly extending vertical portion 60 extending upwardly parallel to cylinder wall 102. Moreover, the portion of piston head 12 above circumferential channel 14 is of slightly reduced diameter so as on the downstroke of piston 10, the combustion-generated pressure behind the ring 11 will cause ring 11 to deform and rotate to provide the converging wedge indicated. A converging wedge on the upstroke could be provided by proper profiling of the undeflected ring.

Figure 5A:
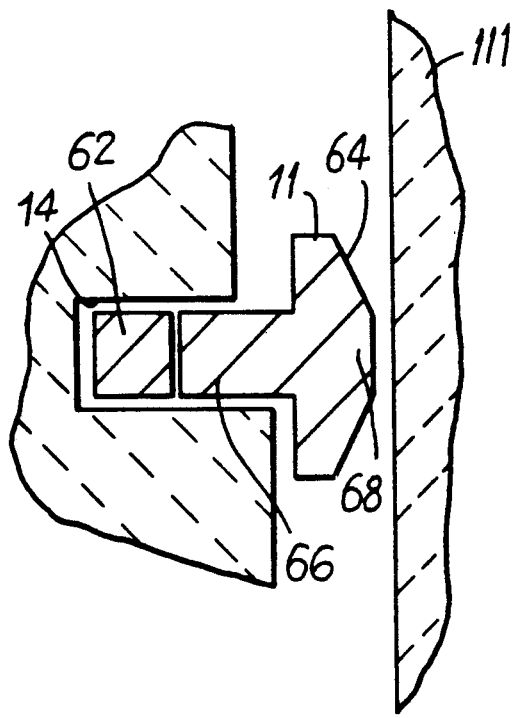
FIGS. 5a and 5b disclose a two-piece, double-acting, tapered-land piston ring for the instant invention.
Figure 5B:
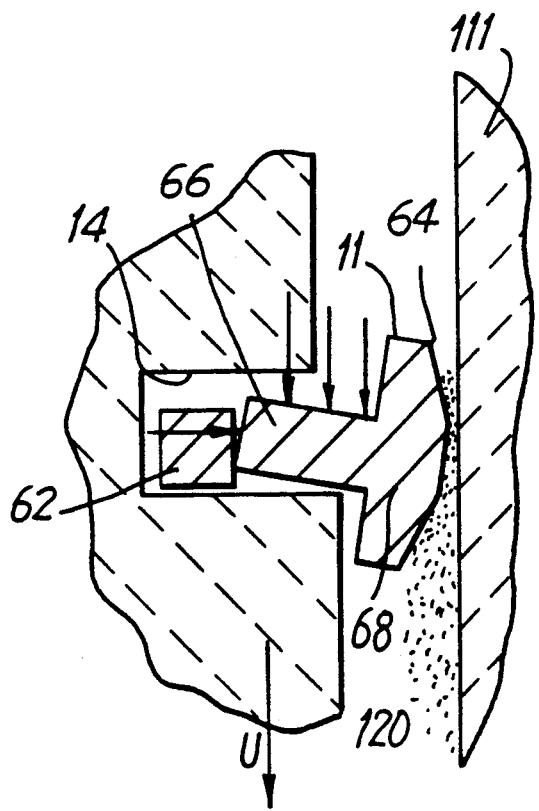

Similarly, FIGS. 5a and 5b disclose a two-piece, double-acting, tapered-land piston ring for the instant invention. Ring 11 includes inner circumferential ring 62 and outer circumferential ring 64 with a T-shaped cross section. Outer circumferential ring 64 includes horizontal portion 66 and double-sided wedge 68. This design of ring 11 achieves a converging wedge effect in both the upstroke and downstroke directions by the profile of the face of ring 11 coupled with an ability of ring 11 to twist under pressure or frictional forces between ring 11 and ceramic liner 111 with lubricant powder 120 therebetween.

The invention of piston 10 is used much as any other piston in a diesel cycle, except that the use of the powder lubrication along with the other various features of this invention achieve the above and other objectives.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. In a diesel engine, a piston comprising:
   a distal end including a piston head impinging upon a combustion chamber formed between the piston and a cylinder of the diesel engine;
   a proximal end including means for attaching the piston to a reciprocating arm means; and p1 at least one powder-lubricated ring circumferentially extending around said piston head, said at least one powder-lubricated ring including means for providing a wedge profile impinging against said cylinder during movement of said piston with respect to said cylinder, wherein lubricant powder is disposed between said powder-lubricated ring and a wall of said cylinder, and wherein said lubricant powder achieves quasi-hydrodynamic flow between the piston and the cylinder.

2. The piston of claim 1 further including a heat dam between said distal end and said proximal end, said heat dam including a portion of substantially decreased diameter thereby forming a chamber within the piston.

3. In a diesel engine fueled by coal-water slurry, a piston comprising:
   a distal end including a piston head impinging upon a combustion chamber formed between the piston and a cylinder of the diesel engine;
   a proximal end including means for attaching the piston to a reciprocating arm means;
   a heat dam between said distal end and said proximal end, said heat dam including a portion of substantially decreased diameter thereby forming a debris chamber within the piston;
   said distal portion including a particulate return valve communicating from said debris chamber to said combustion chamber wherein residue from said coal-water slurry is returned from said debris chamber to said combustion chamber; and
   at least one powder-lubricated ring circumferentially extending around said piston head wherein lubricant powder is disposed between said powder-lubricated ring and a wall of said cylinder.

4. The piston of claim 3 further including at least one ring circumferentially extending around said proximal end impinging against said wall of said cylinder.

5. The piston of claim 4 wherein said at least one ring of said proximal end is lubricated by liquid hydrocarbons.

6. The piston of claim 3 wherein an outer diameter of said piston head is reduced to allow mixing of ash of the coal-water slurry with said lubricant powder.

7. The piston of claim 3 wherein said at least one powder-lubricated ring includes an L-shaped radial cross section with a first portion extending perpendicular to said wall of said cylinder into a lateral circumferential channel in said piston head and a second portion extending parallel to said wall of said cylinder toward said combustion chamber, wherein said second portion extends outward toward said wall of said cylinder in response to combustion-generated pressure in said combustion chamber.

8. The piston of claim 7 wherein a diameter of said piston head adjacently distal to said lateral circumferential channel is less than a diameter of said piston head adjacently proximal to said lateral circumferential channel.

9. The piston of claim 3 wherein said at least one powder-lubricated ring includes a T-shaped radial cross section with a leg portion extending perpendicular to said wall of said cylinder into a lateral circumferential channel in said piston head and a distal wedge-shaped arm portion and a proximal wedge-shaped arm portion extending parallel to said wall of said cylinder, wherein said distal wedge-shaped arm portion flexes outward toward said wall of said cylinder in response to combustion-generated pressure in said combustion chamber.

10. The piston of claim 2 wherein the diesel engine uses a substantially adiabatic cycle and wherein said at least one powder-lubricated ring reaches temperatures in excess of 500° F.

11. The piston of claim 10 further including at least one ring circumferentially extending around said proximal end impinging against said wall of said cylinder.

12. In a diesel engine, a piston comprising:
   a distal end including a piston head impinging upon a combustion chamber formed between the piston and a cylinder of the diesel engine;
   a proximal end including means for attaching the piston to a reciprocating arm means;
   at least one ring circumferentially extending around said proximal end impinging against said wall of said cylinder;
   a heat dam between said distal end and said proximal end, said heat dam including a portion of substantially decreased diameter thereby forming a chamber within the piston;
   at least one powder-lubricated ring circumferentially extending around said piston head wherein lubricant powder is disposed between said powder-lubricated ring and a wall of said cylinder; and
   wherein at least one ring of said proximal end is lubricated by liquid hydrocarbons.

13. In a diesel engine, a piston comprising:
   a distal end including a piston head impinging upon a combustion chamber formed between the piston and a cylinder of the diesel engine;
   a proximal end including means for attaching the piston to a reciprocating arm means;
   a heat dam between said distal end and said proximal end, said heat dam including a portion of substantially decreased diameter thereby forming a chamber within the piston;
   at least one powder-lubricated ring circumferentially extending around said piston head wherein lubricant powder is disposed between said powder-lubricated ring and a wall of said cylinder; and
   wherein said at least one powder-lubricated ring includes an L-shaped radial cross section with a first portion extending perpendicular to said wall of said cylinder into a lateral circumferential channel in said piston head and a second portion extending parallel to said wall of said cylinder toward said combustion chamber, wherein said second portion extends outward toward said wall of said cylinder in response to combustion-generated pressure in said combustion chamber.

14. The piston of claim 13 wherein a diameter of said piston head adjacently distal to said lateral circumferential channel is less than a diameter of said piston head adjacently proximal to said lateral circumferential channel.

15. In a diesel engine, a piston comprising:

a distal end including a piston head impinging upon a combustion chamber formed between the piston and a cylinder of the diesel engine;

a proximal end including means for attaching the piston to a reciprocating arm means;

a heat dam between said distal end and said proximal end, said head dam including a portion of substantially decreased diameter thereby forming a chamber within the piston;

at least one powder-lubricated ring circumferentially extending around said piston head wherein lubricant powder is disposed between said powder-lubricated ring and a wall of said cylinder; and wherein said at least one powder-lubricated ring includes a T-shaped radial cross section with a leg portion extending perpendicular to said wall of said cylinder into a lateral circumferential channel in said piston head and a distal wedge-shaped arm portion and a proximal wedge-shaped arm portion extending parallel to said wall of said cylinder, wherein said distal wedge-shaped arm portion flexes outward toward said wall of said cylinder in response to combustion-generated pressure in said combustion chamber.

16. The piston of claim 12 wherein the diesel engine uses a substantially adiabatic cycle and wherein said at least one powder-lubricated ring reaches temperatures in excess of 500° F.

17. The piston of claim 13 wherein the diesel engine uses a substantially adiabatic cycle and wherein said at least one powder-lubricated ring reaches temperatures in excess of 500° F.

18. The piston of claim 15 wherein the diesel engine uses a substantially adiabatic cycle and wherein said at least one powder-lubricated ring reaches temperatures in excess of 500° F.

* * * * *